March 27, 1973   J. W. KESSLER   3,723,215
METHOD FOR FIXING A FASTENER IN TWO PIECES OF WOOD
Filed March 18, 1970

INVENTOR.
JOHN W. KESSLER
BY
*Walter J. Wessendorf Jr*
*attorney*

# United States Patent Office 3,723,215
Patented Mar. 27, 1973

3,723,215
METHOD FOR FIXING A FASTENER IN TWO PIECES OF WOOD
John W. Kessler, 1172 Glenwood Blvd., Schenectady, N.Y. 12308
Filed Mar. 18, 1970, Ser. No. 20,591
Int. Cl. B32b 31/04
U.S. Cl. 156—92      2 Claims

ABSTRACT OF THE DISCLOSURE

Discloses a fastener and method of fixing same together with two pieces of wood. Cartridges containing thermosetting material, comprising resin and hardener, are disposed in aligned holes drilled in the two pieces of wood. A dowel-like fastener having piercing points is disposed such that one piercing point punctures the cartridge, disposed in the hole of the one piece of wood, to effect bonding of the fastener with such other piece of wood, and thereby fastening together the two pieces of wood.

---

The problem in the art to which this invention apertains is the need for a quick, simple, effective, but inexpensive, method and means of permanently fastening or joining together two pieces of wood, whether for industrial use and application or by the do-it-yourselfer, by fixing a fastener therewith. The object of this invention is to solve the problem of the art by the method and means of this invention outlined in the abstract of the disclosure.

This object and other objects of the invention should be discerned and appreciated from the detailed specification taken in conjunction with the drawings, wherein like reference numerals refer to similar parts throughout the several views, in which.

Figure 1:
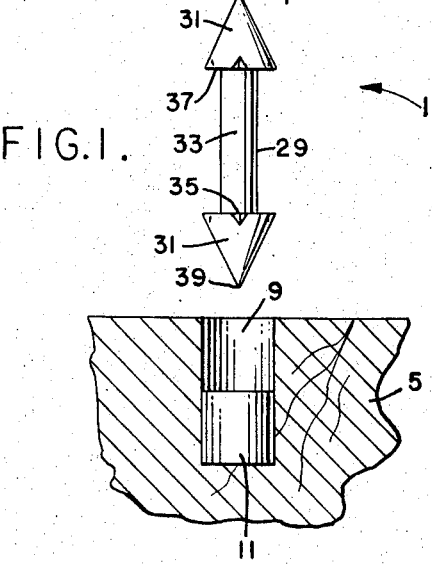
FIG. 1 shows the two pieces of wood disposed preparatory to their being fastened together.

In FIG. 1 of the drawings, reference numeral 1 generally refers to the invention depicting two pieces of wood 3 and 5 disposed preparatory to their being fastened or joined together. Two holes 7 and 9 ¼-inch in diameter and ½-inch deep, are drilled in respective pieces of wood 3 and 5. Sealed, cylindrical cartridges 11 are then disposed in holes 7 and 9.

Figure 2:
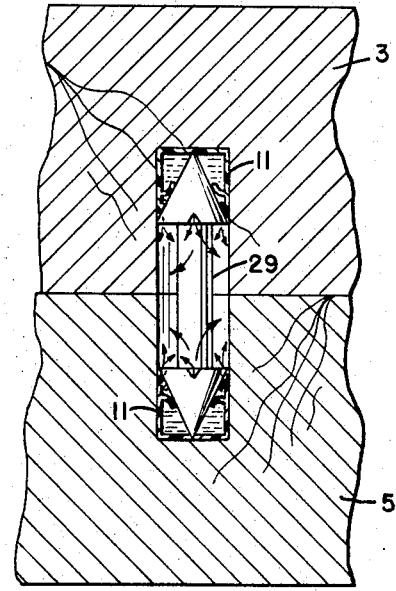
FIG. 2 shows the two pieces of wood fastened together by the method and means of the invention.
Figure 3:
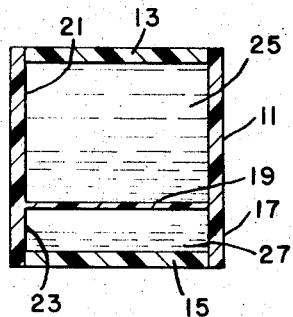
FIG. 3 is a view of one of the cartridges of the invention.
Figure 4:
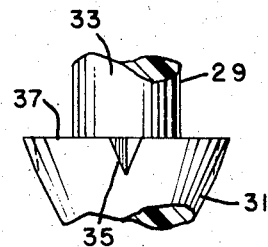
FIG. 4 is a partial view of the dowel-like fastener of the invention.

With reference to FIG. 3, each cartridge 11 is preferably of moulded plastic or other suitable material and has a top 13, bottom 15, wall 17 and thin-walled partition 19 forming a resin compartment 21 and hardener compartment 23. Conventional thermosetting material such as epoxy resin 25 and hardener 27 are contained in the respective resin and hardener compartments 21 and 23. The thickness of bottom 15 and partition 19 are such that they can be pierced or punctured by a piercing point. With reference to FIG. 2, the cartridges 11 are disposed in holes 7 and 9 such that, when the pieces of wood 3 and 5 are fastened or joined together, the bottoms face each other.

The dowel-like fastener 29 is of steel or other suitable material. Fastener 29 is of integral, one-piece construction, has two solid cones 31 joined together by a cylindrical body 33. Each of the cones 31 has flukes 35, as shown, formed in its outer periphery. The bottom surface 37 of each cone 31 is ¼-inch in diameter. Each cone 31 has a piercing point 39 at its terminal portion.

The pieces of wod 3 and 5 are disposed such that their holes 7 and 9 are aligned for reception of fastener 29 to effectuate puncture of cartridges 11 disposed in holes 7 and 9 by the piercing point 39.

A significant feature of the invention resides in the fact that the total volume of the cartridges 11, their thermosetting material, and fastener 29, is slightly greater than the total volume of the two holes 7 and 9. Accordingly, the thermosetting material in cartridges 11 will be forced through the flukes 35 and away from the bottom surfaces 37 in the directions of the arrows in FIG. 2 upon the piercing points 39 puncturing the cartridges 11, thereby assuring that the thermosetting material will further completely occupy the volume remaining between the bottom surfaces 37 of cones 31.

Puncture of the bottoms 15 and partitions 19 by the piercing points 39 causes mixing of the epoxy resin 25 and hardener 27 and, upon setting and hardening, assures adherence of the thermosetting material with the two pieces of wood 3 and 5 and fastener 29, and thereby the permanent fastening or joining together of the two pieces of wood 3 and 5.

Having thusly described my invention, I claim:

1. Method for fixing a fastener in drill holes in two pieces of wood and thereby fastening together the two pieces of wood, comprising positioning a cartridge of thermosetting material in each of the drill holes, each cartridge containing separate compartments of epoxy resin and hardener, puncturing the compartments by inserting in the drill holes, a fastener having piercing points at the fastener ends, the puncturing and piercing resulting in the mixing of the thermosetting material, the fastener having cones, each of which has a bottom surface whose diameter is the same as the drill holes, and the total volume of the cartridges, their thermosetting material and the fastener being slightly greater than the total volume of the two drill holes.

2. The method of claim 1 wherein the fastener cores have flukes in their outer peripheries for flow therethrough of the thermosetting material in a direction opposite to the piercing points which such flow forced by the piercing points.

References Cited
UNITED STATES PATENTS

| | | | |
|---|---|---|---|
| 2,690,879 | 10/1954 | Snyder | 156—92 X |
| 2,842,056 | 7/1958 | Klotz | 181—0.5 XC |
| 3,478,409 | 11/1969 | Votaw et al. | 156—92 X |
| 2,092,341 | 9/1937 | De Vries | 156—92 UX |
| 2,817,620 | 12/1957 | Golick et al. | 156—293 |
| 2,110,053 | 3/1938 | Phillips | 156—92 |
| 2,663,662 | 12/1953 | Graf et al. | 156—92 |

REUBEN EPSTEIN, Primary Examiner

U.S. Cl. X.R.
156—293, 303.1